United States Patent [19]

Brunk

[11] 4,031,663

[45] June 28, 1977

[54] WOODEN BLOCK PLANTER WITH SUPPORTING LEGS

[76] Inventor: Ronald M. Brunk, Rte. 1 Box 192, Greenwood, Va. 22943

[22] Filed: May 24, 1976

[21] Appl. No.: 689,629

[52] U.S. Cl. .................................. 47/66; 47/39; 47/72; 206/45.24; 217/6; 217/11; 248/146; 248/149; 248/151; D6/183; D11/143; D11/155

[51] Int. Cl.² ............... A01G 9/02; B65D 1/00

[58] Field of Search .......... 47/66, 39, 72; D11/143, D11/152–156; 217/5, 6, 11, 68; 248/146, 149, 151, 150; D6/182, 183; 206/45, 24; 220/69

[56] References Cited

UNITED STATES PATENTS

| 710,213 | 9/1902 | Rogers | 217/68 |
|---|---|---|---|
| 1,225,319 | 5/1917 | Ely | 248/151 |
| 1,234,516 | 7/1917 | Wege | 220/69 X |
| 2,828,565 | 4/1958 | Goldstein | 206/45.24 UX |
| D57,145 | 2/1921 | O'Blaza | D6/183 |

FOREIGN PATENTS OR APPLICATIONS

| 8,477 | 5/1894 | Switzerland | 217/6 |

Primary Examiner—Edgar S. Burr
Assistant Examiner—Steven A. Bratlie
Attorney, Agent, or Firm—Sughrue, Rothwell, Mion, Zinn & Macpeak

[57] ABSTRACT

The planter is made from a solid rectilinear block of wood having a recess in the upper surface thereof. Each of the four corners are cut off along a downwardly and inwardly inclined plane and each of the four cut off corner pieces are resecured in a downwardly offset position relative to the block by means of a circumferentially extending band to provide four downwardly extending legs for the planter.

3 Claims, 4 Drawing Figures

WOODEN BLOCK PLANTER WITH SUPPORTING LEGS

BACKGROUND OF THE INVENTION

1. Field of the Invention

The present invention is directed to wooden planters and more specifically to a wooden planter which can be constructed from a single rectilinear block of wood.

2. Prior Art

There are many prior art planters constructed from a plurality of pieces of wood which are secured together to form a hollow planter which can have a substantially rectilinear form or a substantially cylindrical form. It is old and well known with such planters to provide a circumferential reenforcing band to aid in holding the pieces of wood in their assembled form.

SUMMARY OF THE INVENTION

The present invention provides a wooden planter which requires a minimum amount of material and labor while providing an extremely durable and attractive planter construction.

The present invention provides a wooden planter which can be constructed from a single substantially rectilinear block of wood and a single band of flexible material adapted to extend about the circumference of the block for securement to itself. The block of wood is provided with a recess in the upper surface thereof into which the plant may be placed directly or which is of sufficient size to receive a separate clay pot and water dish. Four legs are provided, one at each corner of the block by cutting off each corner along a downwardly and inwardly inclined plane and resecuring the cut off corners to the block in a downwardly offset position relative to the block by means of the circumferentially extending band.

The foregoing and other objects, features and advantages of the invention will be apparent from the following more particular description of a preferred embodiment of the invention as illustrated in the accompanying drawings.

DETAILED DESCRIPTION OF THE PREFERRED EMBODIMENT

Figure 1:
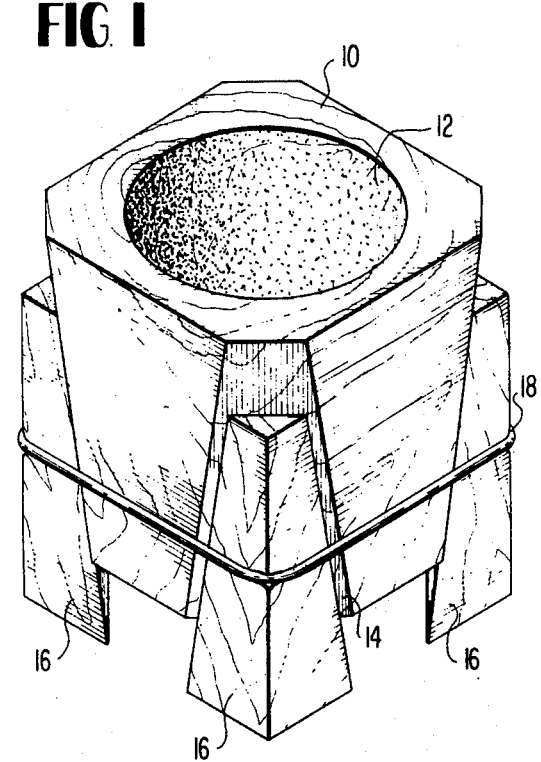
FIG. 1 is a perspective view of the planter according to the present invention.
Figure 2:
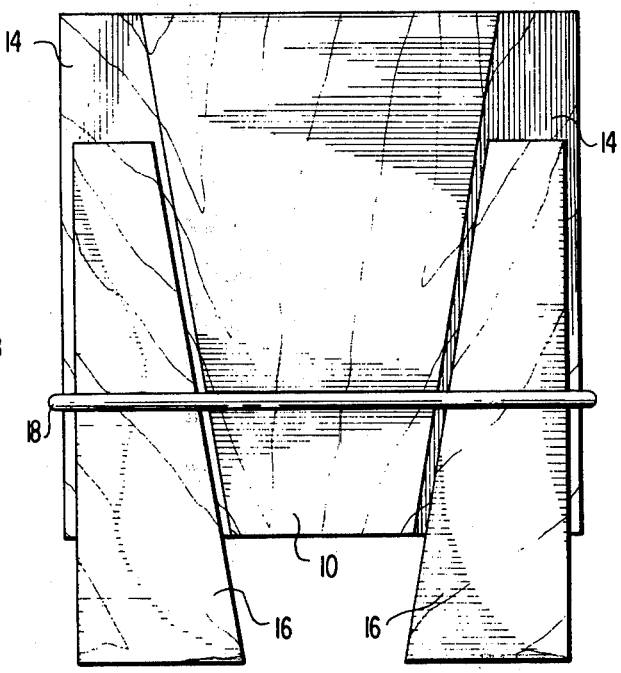
FIG. 2 is a side elevation view of the planter according to the present invention.
Figure 3:
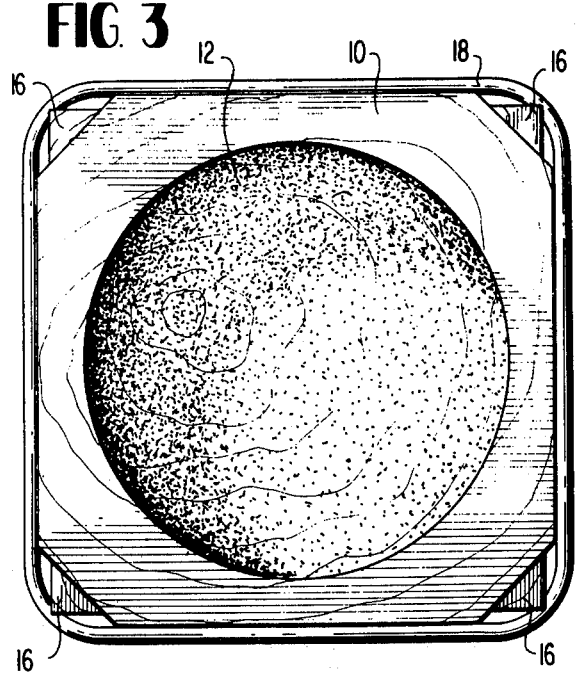
FIG. 3 is a top plan view of the planter according to the present invention.
Figure 4:
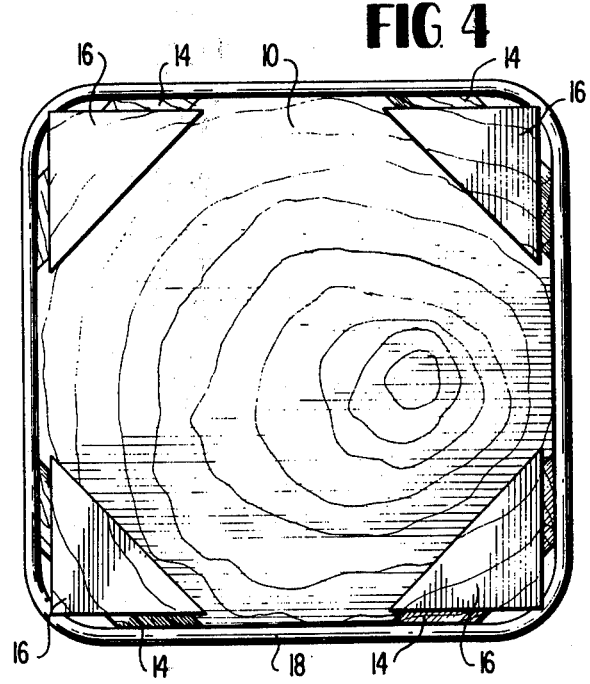
FIG. 4 is a bottom plan view of the planter according to the present invention.

The planter 10 is constructed from a solid block of wood having a recess 12 formed in the upper surface thereof.

Although the planter may be formed from any desired type of wood the use of poplar has proved to be very satisfactory since the wood is easy to work, has a sufficient degree of porosity for the drainage of moisture and weathers attractively to provide a natural finish. In the planter shown in the drawings the recess is in the form of a cylindrical bore which can readily be drilled into the wood. However, it is possible that the recess could be of any desired configuration and formed in any desired manner. Likewise, although, although planter as shown in the drawings is constructed from a cube of wood it is obvious that a planter according to the present invention could be constructed from any block of wood having substantially rectilinear form. It has also been found helpful to char the interior of the recess although this is not absolutely essential.

Each corner of the original block of wood which is used to construct the planter is cut off along a downwardly and inwardly extending plane which extends diagonally across each corner to provide a bevelled trapezoid face 14 at each corner. Each of the cut off pieces are used to provide legs 16 by placing each leg 16 in a downwardly offset position against each bevelled trapezoid face 14. The length of the legs can be varied by the amount of offset and the legs 16 are secured in their adjusted position by means of a band 18 which extends about the periphery of the block and the legs and which is secured to itself by any suitable means. As illustrated in the present application the band is in the form of a flexible copper wire, the ends of which are brazed together to form a substantially invisible joint. Thus, the planter according to the present invention can be constructed completely without the use of nails, nuts and bolts, glue or the like. Since each of the leg portions 16 are identical insofar as the dimensions are concerned the legs can be resecured at the location where they were cut off or at a different location on the planter from which they were cut or on an entirely different planter to provide varying decorative effects due to graining and coloration of the wood. If by chance the legs extend slightly different distances below the bottom of the planter it is only necessary to press downwardly on the planter 10 to equalize the length of the legs 16 and to more firmly secure the planter frictionally to the legs 16.

It is obvious that any type of strap means could be utilized to secure the legs to the planter block such as flat bands of metal or plastic having slidable secureoment means at the opposite ends thereof, rope or the like. The only requirement for the securing means is that it be able to extend about the periphery of the planter and be secured in such a manner as to provide a compressive force to frictionally hold the legs 16 against the planter 10.

Depending upon the nature of the wood used for the planter the use of a circumferential strip for holding the legs on the planter is also important to prevent the undue expansion and cracking of the block which forms the body of the planter.

While the invention has been particularly shown and described with reference to a preferred embodiment thereof it will be understood by those in the art that various changes in form and details may be made therein without departing from the spirit and scope of the invention.

What is claimed is :

1. A wooden planter comprising initially a substantially solid rectilinear block of wood having a recess in the upper surface thereof for the reception of a plant and leg means formed from said block, said leg means comprising substantially identical wedges having a triangular cross-section which are cut from each corner of said block along a downwardly and inwardly inclined plane extending diagonally across each corner of the block, the cutting forming associated pairs of inclined planar surfaces, each pair of inclined surfaces comprising one inclined surface on each leg and one inclined surface on the associated corner of said block, and means for securing said legs along each associated pair of inclined planar surfaces in downwardly depending offset relationship to said block.

2. A wooden planter as set forth in claim 1 wherein said means for securing said legs to said block comprising band means extending about the circumference of said block and engaging said legs to frictionally hold said legs against said block.

3. A wooden planter as set forth in claim 2 wherein said band means comprising an elongated piece of flexible metal and means for securing the opposite ends of said piece together.

* * * * *